July 30, 1957 F. A. WOOD 2,800,698

MOUNTING CLIP

Filed Feb. 24, 1954

FRANK A. WOOD
*INVENTOR.*

BY Francis W. Crotty

HIS ATTORNEY.

United States Patent Office 2,800,698

Patented July 30, 1957

2,800,698

MOUNTING CLIP

Frank A. Wood, Elmhurst, Ill., assignor to Zenith Radio Corporation, a corporation of Illinois Application February 24, 1954, Serial No. 412,316

4 Claims. (Cl. 24—81)

This invention relates to a mounting clip and, more particularly, to a mounting clip for attaching a shield can to the chassis of a wave-signal receiver.

Shielding of certain electronic components, such as coils and transformers, is frequently necessary to prevent interaction between the various elements of a receiver. The insertion of the transformer or coil within an enclosing metallic shield can is one widely practised mode of accomplishing the desired shielding effect. However, the development of a simple device to provide a convenient means for mechanically attaching the shield can to a chassis member has proved troublesome to television and radio manufacturers.

Heretofore, shield cans have been attached to a chassis structure by means of rivets, bolts or the like but the process of riveting or bolting each shield into place is time-consuming and costly and is not in keeping with the desire of radio and television manufacturers to reduce costs. As a result, the art has developed a type of snap-in fastener which is attached to the shield by means of rivets or bolts or by insertion into an opening in the wall of the shield and then snapped in place in a receiving aperture in the radio chassis. Fastening devices of this type have somewhat reduced the problems outlined above but are deficient in that they are not universally applicable to shield cans of varying sizes.

Furthermore, these fastening devices are intricate in design and render the manufacturing cost undesirably high.

It is an object of this invention, therefore, to provide a new and improved mounting clip for securing a shield can to the chassis of a radio or television receiver.

It is a further object of the invention to provide a mounting clip which is universally applicable to shield cans of different configuration and dimensions.

It is an additional object of the invention to provide a new and improved mounting clip which is simple and expedient to construct and convenient and economical to manufacture.

In accordance with the invention, a universal mounting clip for installing a shield can within an aperture of a chassis is formed of a unitary sheet-metal stamping and comprises a clamp member of substantially U-shaped cross-sectional configuration, having inner and outer legs resiliently biased toward each other and adapted for gripping engagement with the shield. The outer legs of the clamp member is provided with upper and lower portions respectively extending above and below the chassis when the shield can is received in the aperture. A pair of denticles project downwardly and outwardly from the upper portion of the other leg and are adapted to engage one surface of the chassis on one side of the aperture and a resilient detent projects upwardly and outwardly from the lower portion of the outer leg and is adapted to engage the opposite surface of the chassis at the same side of the aperture and retain the shield in firm mechanical and electrical engagement with the chassis.

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

Figure 1:
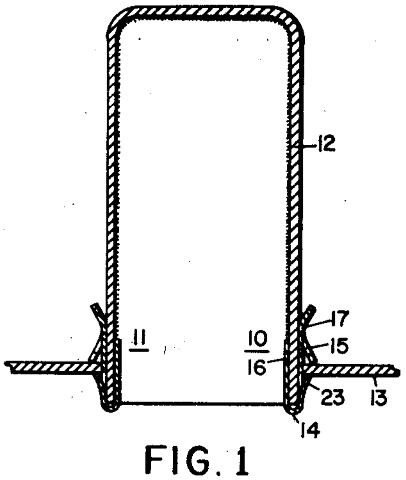
Figure 1 is a cross-sectional view of a shield can attached to a chassis by means of a pair of mounting clips constructed in accordance with the invention.

Figure 1 portrays a pair of universal mounting clips 10 and 11, each having a substantially U-shaped cross-sectional configuration for attaching a rectangular sheet-metal shield can 12, which may be formed of any suitable conductive metal such as aluminum, to a chassis member 13 which is provided with a rectangular receiving aperture. Since mounting clips 10 and 11 are identical, further explanation is limited to a detailed consideration of clip 10 only.

The clip may be formed of a unitary sheet-metal stamping, such as light gauge cadmium-plated steel, and comprises a re-entrant clamp member 14 having a pair of legs 15, 16 which are resiliently biased inwardly, that is, toward one another, for gripping engagement with shield can 12. Accordingly, mounting clip 10 may be conveniently secured to shield 12 by merely slipping it over the open end of the shield to allow legs 15, 16 to respectively grip the inner and outer surface of one wall of the shield.

Figure 2:
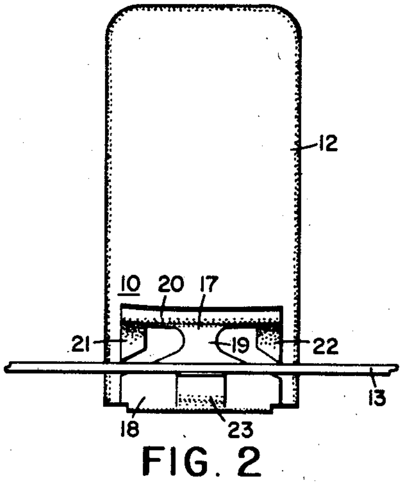
Figure 2 is a side elevation of Figure 1 showing a front view of one of the clips illustrated in the first figure.

As illustrated in Figure 2, shield 12 extends through the plane of chassis 13 for optimum isolation of the coil or transformer assembly (not shown) housed therein from other circuits of the receiver. When the shield is in place, extending through the chassis opening, a first portion 17 of mounting clip 10 extends above the chassis and a second portion 18 thereof projects below the chassis. Clip portion 17 is of substantially T-shaped configuration in plan having a narrow neck 19 and a cross piece 20 which is longitudinally deformed or bent with respect to the plane of neck portion 19 for mechanical rigidity. A pair of outwardly projecting denticles 21, 22 respectively depend from the ends of cross piece 20 to engage the upper surface of chassis 13 on one side of the aperture provided to receive the shield, and an outwardly projecting resilient detent 23 extends upwardly from clip portion 18 to engage the lower surface of chassis 13 on the same side of the receiving aperture. The lengths of denticles 21, 22 and detent 23 are determined in accordance with the thickness of the chassis into which the shield is to be installed so that they may effect firm engagement with opposed surfaces of the chassis.

Figure 3:
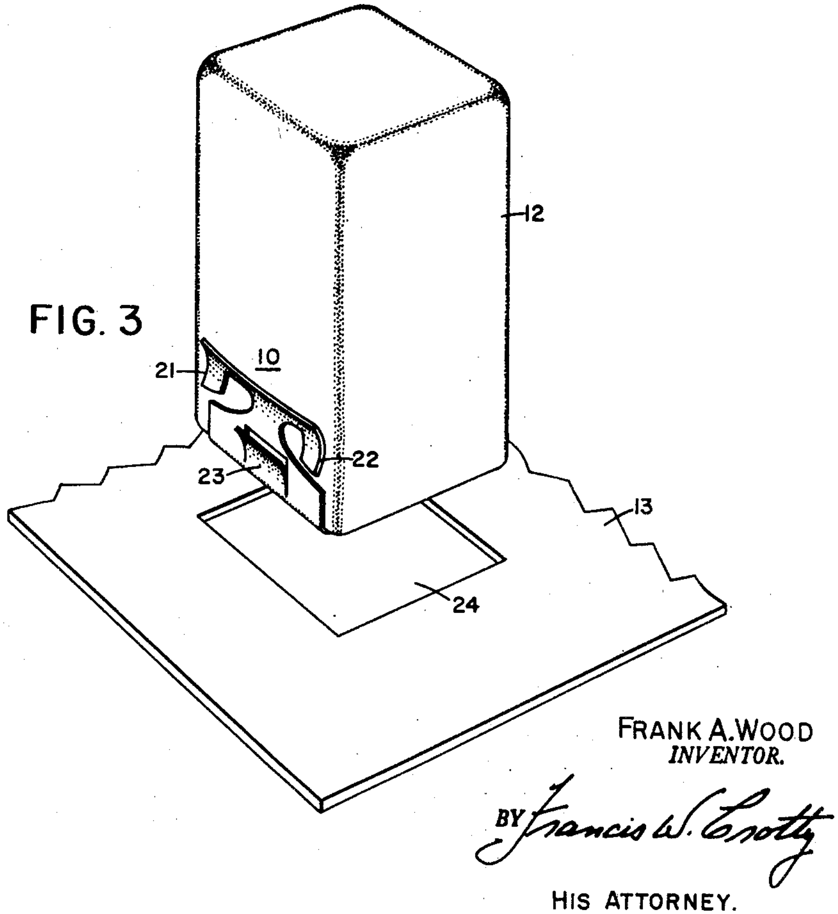
Figure 3 is an exploded perspective view showing the shield can and mounting clip assembly of Figure 1 removed from the chassis to illustrate the manner of securing the same thereto.

In Figure 3, shield 12 is shown positioned for insertion into aperture 24 of chassis 13. As the shield is inserted into aperture 24, detent 23 engages one side of the aperture and, as pressure is applied to the top of the shield, the detent is compressed to allow the shield to be lowered until denticles 21, 22 engage the upper surface of chassis 13. Denticles 21, 22 are resilient in a direction perpendicular to chassis 13, allowing shield 12 to be lowered still further into aperture 24 until resilient detent 23 is freed of the aperture to latch in firm engagement with the under side of chassis 13. In this manner, shield can 12 is mounted in a position extending through aperture 24 and is in firm mechanical and electrical engagement with chassis 13. When shield 12 is in place, denticles 21, 22 and detent 23 exert a clamping action on the chassis to provide excellent electrical grounding for the shield; if desired, detent 23 may be replaced by a pair of similarly formed detents in substantially direct opposition to denticles 21 and 22 respectively.

Merely by way of illustration, and in no sense by way of limitation, a working embodiment of the invention may be constructed by stamping neck portion 19, cross piece 20, denticles 21, 22, and detent 23 out of a single flat piece of light gauge cadmium plated steel approximately ⅝ inch wide and 11/15 inch long. The stamping thus formed may then be bent to form legs 15, 16 and deformed to provide denticles 21, 22 and detent 23.

From the foregoing, it is evident that the invention provides a unitary mounting clip of improved design which may be slipped over the open end of a shield to secure the shield to a chassis. The shield may be established in firm mechanical and electrical engagement with the chassis through the simple clamping action of the clip. The mounting clip may be utilized for securing shields to chassis of varying thicknesses, within reasonable limitations, since the pair of denticles which engage the top surface of the chassis are resilient in a vertical direction, or in a direction perpendicular to the chassis. Further, the clip is not limited in its application to a shield of any particular configuration, since it may be deformed to fit the open end of either a round or a rectangular shield. Also, the mounting clip may be applied to shields of varying dimension, since the width of the clip need not conform to the width of the shield.

While a particular embodiment of the invention has been shown and described, modifications may be made and it is intended in the appended claims to cover all such modifications as may fall within the true spirit and scope of the invention.

I claim:

1. A universal mounting clip for installing a shield can within an aperture of a chassis, said mounting clip being formed of a unitary sheet-metal stamping and comprising: a clamp member of substantially U-shaped cross-sectional configuration, having inner and outer legs resiliently biased toward one another and adapted for gripping engagement with said shield can, said outer leg of said clamp member having upper and lower portions respectively extending above and below said chassis when said shield can is received in said aperture; a pair of denticles projecting downwardly and outwardly from said upper portion of said outer leg and adapted to engage one surface of said chassis at one side of said aperture; and a resilient detent projecting upwardly and outwardly from said lower portion of said outer leg and adapted to engage the opposite surface of said chassis at said one side of said aperture to retain said shield can in firm mechanical and electrical engagement with said chassis.

2. A universal mounting clip for installing a shield can within an aperture of a chassis, said mounting clip being formed of a unitary sheet-metal stamping and comprising: a clamp member of substantially U-shaped cross- sectional configuration, having inner and outer legs resiliently biased toward one another and adapted for gripping engagement with said shield can, said outer leg of said clamp member having upper and lower portions respectively extending above and below said chassis when said shield can is received in said aperture; a pair of denticles projecting downwardly and outwardly from said upper portion of said outer leg, resiliently displaceable in a direction perpendicular to said chassis, and adapted to engage one surface of said chassis at one side of said aperture; and a resilient detent projecting upwardly and outwardly from said lower portion of said outer leg and adapted to engage the opposite surface of said chassis at said one side of said aperture to retain said shield can in firm mechanical and electrical engagement with said chassis.

3. A universal mounting clip for installing a shield can within an aperture of a chassis, said mounting clip being formed of a unitary sheet-metal stamping and comprising: a clamp member of substantially U-shaped cross-sectional configuration, having inner and outer legs resiliently biased toward one another and adapted for gripping engagement with said shield can, said outer leg of said clamp member having upper and lower portions respectively extending above and below said chassis when said shield can is received in said aperture, said upper portion of said outer leg being of substantially T-shaped configuration with a narrow neck portion and a cross-piece disposed perpendicular to said neck portion; a pair of denticles projecting downwardly and outwardly from said cross-piece, resiliently displaceable in a direction perpendicular to said chassis, and adapted to engage one surface of said chassis at one side of said aperture; and a resilient detent projecting upwardly and outwardly from said lower portion of said outer leg and adapted to engage the opposite surface of said chassis at said one side of said aperture to retain said shield can in firm mechanical and electrical engagement with said chassis.

4. A universal mounting clip for installing a shield can within an aperture of a chassis, said mounting clip being formed of a unitary sheet-metal stamping and comprising: a clamp member of substantially U-shaped cross-sectional configuration, and having inner and outer legs resiliently biased toward one another and adapted for gripping engagement with said shield can, said outer leg of said clamp member having upper and lower portions respectively extending above and below said chassis when said shield can is received in said aperture, said upper portion of said outer leg being of substantially T-shaped configuration with a narrow neck portion and a cross-piece disposed perpendicular to said neck portion; of pair of denticles projecting downwardly and outwardly from said cross-piece, resiliently displaceable in a direction perpendicular to said chassis, and adapted to engage one surface of said chassis at one side of said aperture; and a resilient detent integral with said lower portion of said outer leg and projecting upwardly and outwardly therefrom, said detent being adapted to engage the opposite surface of said chassis at said one side of said aperture to retain said shield can in firm mechanical and electrical engagement with said chassis.

References Cited in the file of this patent

UNITED STATES PATENTS

| | | |
|---|---|---|
| 2,181,966 | Dean | Dec. 5, 1939 |
| 2,499,637 | Flora | Mar. 7, 1950 |
| 2,520,725 | Judd | Aug. 29, 1950 |
| 2,531,911 | Johnson | Nov. 28, 1950 |
| 2,586,728 | Shepard | Feb. 19, 1952 |
| 2,639,311 | Cook | May 19, 1953 |